(12) United States Patent
Banavalikar

(10) Patent No.: US 9,749,221 B2
(45) Date of Patent: Aug. 29, 2017

(54) MULTI-DESTINATION PACKET HANDLING AT OVERLAY VIRTUAL NETWORK TUNNELING ENDPOINTS

(71) Applicant: INTERNATIONAL BUSINESS MACHINES CORPORATION, Armonk, NY (US)

(72) Inventor: Bhalachandra G. Banavalikar, Cupertino, CA (US)

(73) Assignee: International Business Machines Corporation, Armonk, NY (US)

( * ) Notice: Subject to any disclaimer, the term of this patent is extended or adjusted under 35 U.S.C. 154(b) by 84 days.

(21) Appl. No.: 14/733,264

(22) Filed: Jun. 8, 2015

(65) Prior Publication Data

US 2016/0359729 A1    Dec. 8, 2016

(51) Int. Cl.
| | | |
|---|---|---|
| H04L 12/761 | (2013.01) | |
| H04L 12/44 | (2006.01) | |
| H04L 12/46 | (2006.01) | |
| H04L 12/931 | (2013.01) | |
| H04L 12/715 | (2013.01) | |

(52) U.S. Cl.
CPC .......... H04L 45/16 (2013.01); H04L 12/4641 (2013.01); H04L 45/64 (2013.01); H04L 49/70 (2013.01)

(58) Field of Classification Search
None
See application file for complete search history.

(56) References Cited

U.S. PATENT DOCUMENTS

| | | |
|---|---|---|
| 5,511,168 A | 4/1996 | Perlman et al. |
| 6,069,895 A | 5/2000 | Ayandeh |
| 6,483,832 B1 | 11/2002 | Civanlar et al. |
| 7,385,977 B2 | 6/2008 | Wu et al. |
| 8,059,647 B2 | 11/2011 | Ashwood-Smith et al. |
| 8,369,258 B2 | 2/2013 | Balay et al. |
| 8,374,182 B2 | 2/2013 | Mehta et al. |

(Continued)

FOREIGN PATENT DOCUMENTS

CN    101511054 B    12/2010

OTHER PUBLICATIONS

Chu et al. "A Case for End System Multicast". SIGMETRICS 2000, Santa Clara, CA. Copyright 2000 ACM.

(Continued)

*Primary Examiner* — Robert C Scheibel
(74) *Attorney, Agent, or Firm* — William H. Hartwell

(57) ABSTRACT

In one embodiment, a method provides for hosting, by a first virtual switch of an overlay virtual network, a multi-destination receiver for a multi-destination group. The first virtual switch receives, from a second virtual switch hosting a multi-destination sender for the multi-destination group, a single copy of a multi-destination packet, wherein the first virtual switch is represented by a node of a plurality of nodes in a tree created by a network controller, and wherein each of the nodes represents a virtual switch that has registered a multi-destination receiver with the network controller. The first virtual switch forwards the received multi-destination packet to a third virtual switch hosting a multi-destination receiver for the multi-destination group, wherein the third virtual switch is represented in the tree by a child of the node.

20 Claims, 5 Drawing Sheets

(56) References Cited

U.S. PATENT DOCUMENTS

| | | | |
|---|---|---|---|
| 8,416,776 B2 | 4/2013 | Lim et al. | |
| 8,443,103 B2 | 5/2013 | Jain et al. | |
| 8,520,556 B2 | 8/2013 | Karuppiah et al. | |
| 8,667,173 B2 | 3/2014 | McCanne | |
| 2002/0150094 A1 | 10/2002 | Cheng et al. | |
| 2003/0088696 A1* | 5/2003 | McCanne | H04L 12/1836 709/238 |
| 2006/0187950 A1 | 8/2006 | Bou-Diab et al. | |
| 2013/0114594 A1 | 5/2013 | Van Zijst | |
| 2013/0148658 A1 | 6/2013 | Khanna et al. | |
| 2013/0250951 A1* | 9/2013 | Koganti | H04L 49/356 370/390 |
| 2013/0329605 A1* | 12/2013 | Nakil | H04L 41/0668 370/255 |
| 2013/0329725 A1* | 12/2013 | Nakil | H04L 45/586 370/360 |
| 2014/0192804 A1* | 7/2014 | Ghanwani | H04L 49/70 370/390 |
| 2014/0355450 A1* | 12/2014 | Bhikkaji | H04L 47/125 370/237 |
| 2015/0280928 A1* | 10/2015 | Tessmer | H04L 12/4641 370/390 |
| 2016/0006646 A1* | 1/2016 | Lin | H04L 12/6418 370/390 |
| 2016/0142220 A1* | 5/2016 | Hao | H04L 12/18 370/390 |
| 2016/0226753 A1* | 8/2016 | Young | H04L 45/48 |
| 2016/0277463 A1* | 9/2016 | Nagarajan | H04L 65/4076 |

OTHER PUBLICATIONS

Roca et al. "A Host-Based Multicast (HBM) Solution for Group Communications". ICN 2001. LNCS 2093. pp. 610-619. Copyright Springer-Verlag Berlin Heidelberg 2001.

Sivaram et al. "Architectural Support for Efficient Multicasting in Irregular Networks". IEEE Transactions on Parallel and Distributed Systems. vol. 12, No. 5, May 2001. pp. 489-513.

* cited by examiner

MULTI-DESTINATION PACKET HANDLING AT OVERLAY VIRTUAL NETWORK TUNNELING ENDPOINTS

TECHNICAL FIELD

The present invention relates generally to the field of multi-destination packet handling, and more particularly to multi-destination packet handling at overlay virtual network tunneling endpoints.

BACKGROUND

A data processing environment comprises a variety of hardware, software, and firmware networking components. A physical network, also called an underlay, is a network defined using such components. Techniques are available presently to construct a logical network, also known as a software defined network (SDN) overlay (hereinafter "overlay," "overlay network," "overlay virtual network," or "OVN") from such networking components. Essentially, networking components are abstracted into corresponding logical or virtual representations, and the abstractions are used to define the overlay. In other words, an overlay is a logical network formed and operated using logical representations of underlying networking components. An overlay virtual network includes nodes and logical links that are built on top of an existing network for the purpose of implementing and providing a network service that is not available in the existing network.

A hypervisor, also referred to as a virtual machine monitor (VMM), is a piece of computer software, firmware or hardware that creates and runs virtual machines. A computer on which a hypervisor is executing one or more virtual machines is defined as a host machine. Each virtual machine is called a guest machine. The hypervisor presents guest operating systems with a virtual operating platform and manages the execution of the guest operating systems. Multiple instances of a variety of operating systems may share the virtualized hardware resources.

A virtual machine (VM) comprises virtualized representations of real hardware, software, and firmware components available in a data processing system. The data processing system can have any number of VMs configured thereon, and utilizing any number of virtualized components therein. The data processing system is also referred to as a computing node, a compute node, a node, or a host.

A virtual switch, sometimes herein referred to as a vSwitch, is a software application that allows communication between VMs. A virtual switch is completely virtual and can connect to a network interface card (NIC). A virtual switch merges physical switches into a single logical switch. This helps to increase bandwidth and create an active mesh between servers and switches. A virtual switch may be embedded into a server's installed software or included in a server's hardware as part of its firmware.

In large scale data processing environments, such as in a data center, thousands of VMs can be operating on a host at any given time, and hundreds if not thousands of such hosts may be operational in the data center at the time. A virtualized data processing environment such as the described data center is often referred to as a "cloud" that provides computing resources and computing services to several clients on an as-needed basis.

Network virtualization by defining overlay networks is an emerging trend in the management and operation of data centers and cloud computing environments. One of the goals of network virtualization is to simplify the network provisioning in multi-tenant data processing environments, as well as dedicated customer data processing environments.

Unicasting is a method of sending data point-to-point, to wit, from a single sender to a single receiver. Broadcasting is a method of sending the same data to all possible destinations. Another multi-destination distribution method, multicasting, sends the same data only to interested destinations called receivers by using special address assignments. Internet Protocol (IP) multicast is the process of multicasting IP packets to several receivers in a single transmission of the IP packet. IP multicast is a popular technique used to help conserve bandwidth in the data center and reduce the load on servers.

IP multicast operating in an overlay network is called overlay multicast. Overlay multicast can be achieved in different ways, depending on the support for multicasting provided in the underlay network. Multicast based overlay multicast requires the underlay network to provide support for multicasting. Multicasting in underlay networks is not presently prevalent in data processing environments. Multi-unicast based overlay multicast is a method to transmit multicast packets in the overlay network where the underlay supports unicasting but does not support multicasting.

SUMMARY

In one embodiment, a method includes hosting, by a first virtual switch of an overlay virtual network, a multi-destination receiver for a multi-destination group. The first virtual switch receives, from a second virtual switch hosting a multi-destination sender for the multi-destination group, a single copy of a multi-destination packet, wherein the first virtual switch is represented by a node of a plurality of nodes in a tree created by a network controller, and wherein each of the nodes represents a virtual switch that has registered a multi-destination receiver with the network controller. The first virtual switch forwards the received multi-destination packet to a third virtual switch hosting a multi-destination receiver for the multi-destination group, wherein the third virtual switch is represented in the tree by a child of the node.

In another embodiment, a computer program product includes one or more computer readable storage media and program instructions stored on the one or more computer readable storage media. The stored program instructions include program instructions to host, by a first virtual switch of an overlay virtual network, a multi-destination receiver for a multi-destination group. The stored program instructions further include program instructions to receive, by the first virtual switch, from a second virtual switch hosting a multi-destination sender for the multi-destination group, a single copy of a multi-destination packet, wherein the first virtual switch is represented by a node of a plurality of nodes in a tree created by a network controller, and wherein each of the nodes represents a virtual switch that has registered a multi-destination receiver with the network controller. The stored program instructions further include program instructions to forward, by the first virtual switch, the received multi-destination packet to a third virtual switch hosting a multi-destination receiver for the multi-destination group, wherein the third virtual switch is represented in the tree by a child of the node.

In another embodiment, a computer system includes one or more computer processors, one or more computer readable storage media, and program instruction stored on the computer readable storage media for execution by at least one of the one or more processors. The stored program instructions include program instructions to host, by a first virtual switch of an overlay virtual network, a multi-destination receiver for a multi-destination group. The stored program instructions further include program instructions to receive, by the first virtual switch, from a second virtual switch hosting a multi-destination sender for the multi-destination group, a single copy of a multi-destination packet, wherein the first virtual switch is represented by a node of a plurality of nodes in a tree created by a network controller, and wherein each of the nodes represents a virtual switch that has registered a multi-destination receiver with the network controller. The stored program instructions further include program instructions to forward, by the first virtual switch, the received multi-destination packet to a third virtual switch hosting a multi-destination receiver for the multi-destination group, wherein the third virtual switch is represented in the tree by a child of the node.

DETAILED DESCRIPTION

Embodiments in accordance with the present invention include an improved network controller that reduces the burden on central processing units (CPU), reduces network latency, and provides highly efficient forwarding of multi-destination packets across overlay virtual networks. Embodiments in accordance with the present invention also create optimal path graphs of network nodes representing virtual network tunneling endpoints (VNTEPs) connecting virtual switches (vSwitch) to an OVN transport network. Embodiments in accordance with the present invention use the optimal path graphs of the network nodes to reduce copies of multi-destination packets on each of the participating nodes.

Existing OVNs implement various solutions for handling multi-destination packets, many of which depend on underlay network multicast support to handle multicast traffic and consume large amounts of resources. Therefore, these solutions are restricted to only networks where underlay network multicast support is present and have enough multicast group resources available to support a large number of multicast group requirements for a large number of virtual networks. Embodiments described herein recognize that such an approach has scaling limitations, with performance diminishing as concurrent multicast requirements per virtual network grow. Other types of OVN solutions use repetitive unicast for each multicast packet. Such solutions maintain a list of all possible VNTEPs that host multicast receivers and perform head-end-replication for each of the destination VNTEPs. However, this approach burdens host CPUs with packet processing needs, and could potentially impact data path performance for processing other unicast packets. Embodiments described herein recognize that such an approach also has scaling limitations, with performance diminishing as the number of VNTEPs hosting multicast receivers grows.

Embodiments described herein propose an approach for multi-destination packet handling in overlay virtual networks that easily scales with increasing or decreasing numbers of multicast receivers, does not burden host CPUs, provides reduced latency, and provides highly efficient forwarding of multi-destination packets across an OVN transport network.

Figure 1:
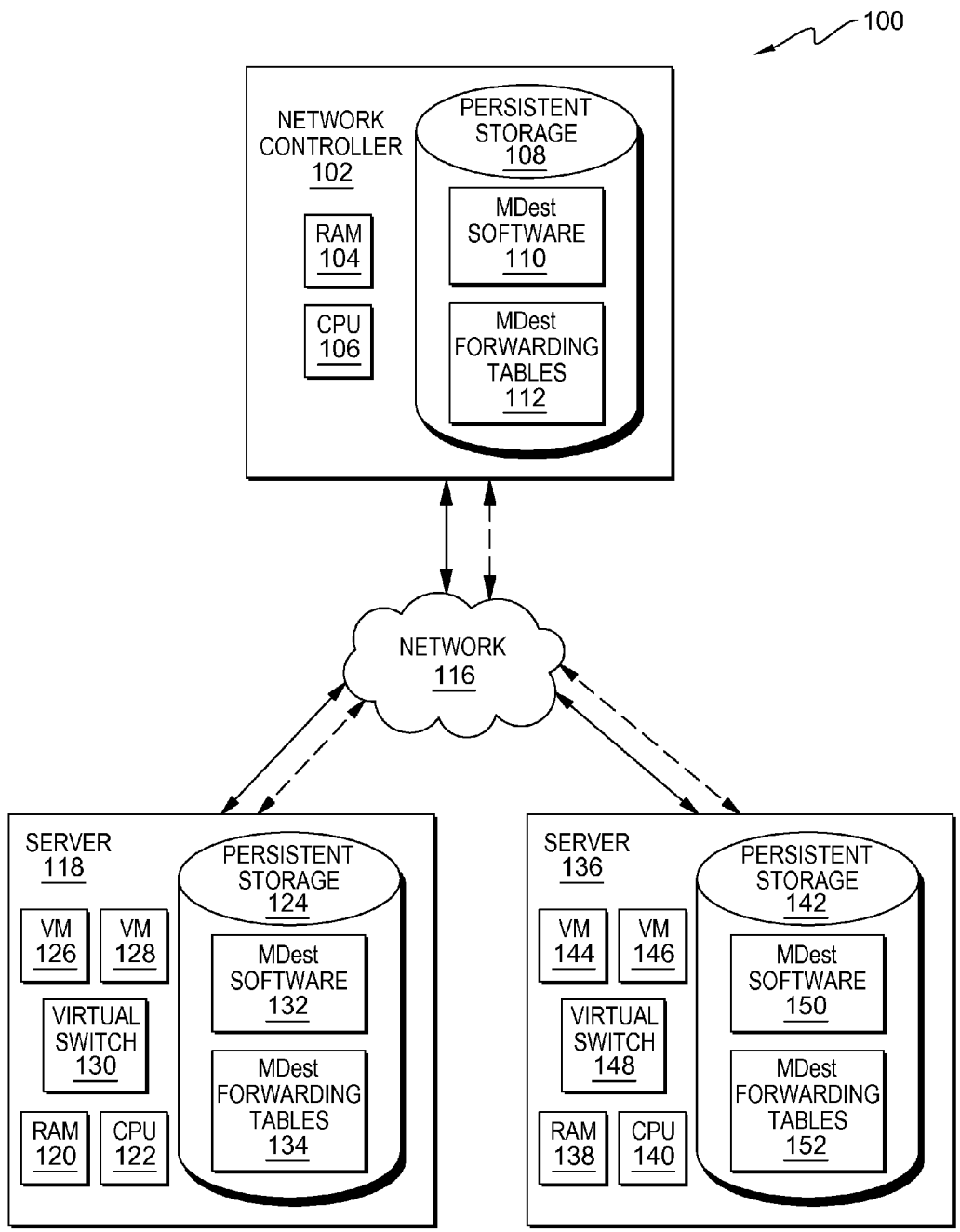
FIG. 1 is a functional block diagram illustrating a multi-destination packet processing environment using an overlay virtual network, in an embodiment in accordance with the present invention.

The present invention will now be described in detail with reference to the Figures. FIG. 1 is a functional block diagram, generally designated 100, illustrating a multi-destination packet processing environment using an overlay virtual network, in an embodiment in accordance with the present invention.

Multi-destination packet processing environment 100 includes a network controller 102, a server 118, and a server 136, all interconnected over a network 116. Network controller 102, server 118, and server 136 may each be any electronic device or combination of electronic devices capable of processing program instructions and receiving and sending data, for example, over network 116. In some embodiments, network controller 102, server 118, and server 136 may be a laptop computer, a tablet computer, a netbook computer, a personal computer (PC), a desktop computer, a server computer, a personal digital assistant (PDA), or smart phone. In other embodiments, network controller 102, server 118, and server 136 may each represent server computing systems utilizing multiple computers as a server system, such as in a distributed computing environment.

In FIG. 1, network controller 102 is an SDN controller that has visibility of end to end provisioning of virtual networks, virtual switches, and virtual endpoints (multi-destination senders and receivers). Network controller 102 contains RAM 104, central processing unit 106, and persistent storage 108. Persistent storage 108 may, for example, be a hard disk drive. Alternatively, or in addition to a magnetic hard disk drive, persistent storage 108 may include a solid state hard drive, a semiconductor storage device, read-only memory (ROM), erasable programmable read-only memory (EPROM), flash memory, or any other computer-readable storage medium that is capable of storing program instructions or digital information. Persistent storage 108 contains multi-destination (mdest) software 110 that enables network controller 102 to communicate with server 118 and server 136 over a data connection on network 116. Persistent storage 108 also includes multi-destination forwarding tables 112 that enables network controller 116 to multi-destination forwarding trees of all the VNTEPs in network 116, and update the individual vSwitches with multi-destination forwarding tables. Network controller 102 is responsible for creating optimal path graphs of network nodes representing VNTEPs connecting virtual switches to the OVN transport network, which reduces copies of multi-destination packets on each of the participating nodes. Network controller 102 creates an optimal path graph using an algorithm for finding the shortest path between nodes. Network controller 102 stores the created optimal path graphs in multi-destination (mdest) forwarding tables 112 in persistent storage 108. In other example embodiments, network controller 102 stores multi-destination forwarding tables 112 on another computing device in multi-destination packet processing environment 100. In the present example embodiment, network controller 102 resides in a computer connected to network 116. In other embodiments, network controller 102 may be contained on server 118 and/or server 136, or some computing device in multi-destination packet processing environment 100. Some embodiments may include more than one network controller in multi-destination packet processing environment 100 to, for example, serve as a backup to network controller 102.

In FIG. 1, network 116 is shown as the interconnecting fabric between network controller 102, server 118, and server 136. In practice, network 116 may be any data transport network. Network 116 can be, for example, a local area network (LAN), a wide area network (WAN) such as the Internet, or a combination of the two, and can include wired, wireless, or fiber optic connections. In general, network 116 can be any combination of connections and protocols that will support communications between network controller 102, server 118, and server 136 in accordance with an embodiment of the invention.

Server 118, also referred to as a multi-destination sender in the example embodiment, includes a RAM 120, a CPU 122, a persistent storage 124, a VM 126, a VM 128, and a virtual switch 130, also referred to as "vSwitch" 130. Persistent storage 124 may, for example, be a hard disk drive. Alternatively, or in addition to a magnetic hard disk drive, persistent storage 124 may include a solid state hard drive, a semiconductor storage device, read-only memory (ROM), erasable programmable read-only memory (EPROM), flash memory, or any other computer-readable storage medium that is capable of storing program instructions or digital information. Persistent storage 124 stores operating system software, as well as software that enables server 118 to communicate with network controller 102, and server 136 over a data connection on network 116. Multi-destination software 132 (sometimes abbreviated as "mdest software 132") and multi-destination forwarding tables 134 (sometimes abbreviated as "mdest forwarding tables 134") are stored in persistent storage 124. Multi-destination software 132 is software that enables virtual switch 130 to communicate with network controller 102, VM 126 and VM 128 on server 118; a VM 144, a VM 146, and a virtual switch 148 on server 136 over a virtual overlay data connection on network 116. Multi-destination forwarding tables 134, also referred to as "mdest forwarding tables 134", are generated by network controller 102 and stored in persistent storage 124 in response to a multi-destination node joining or leaving a multi-destination group.

VM 126 communicates with VM 144 through virtual switch 130 and virtual switch 148 using an overlay virtual network on network 116. VM 128 communicates with VM 146 through virtual switch 130 and virtual switch 148 using a separate overlay virtual network on network 116. Virtual switch 130 is used by VM 126 and VM 128 to communicate with nodes on their respective overlay network on network 116. In one embodiment, there may be many virtual machines and virtual overlay networks existing in multi-destination packet processing environment 100. In other embodiments, network controller 102 may reside on a server in multi-destination packet processing environment 100, or as a standalone computer connected to network 116.

Multi-destination packet processing environment 100 also includes server 136. Server 136, also referred to as a multi-destination receiver in the example embodiment, includes a RAM 138, a CPU 140, a persistent storage 142, VM 144, VM 146, and virtual switch 148. Persistent storage 142 contains mdest software 150 and multi-destination forwarding tables 152 analogous to mdest software 110 and mdest forwarding tables 112, respectively. Multi-destination software 150 is software that enables virtual switch 148 to communicate with network controller 102, VM 126 and VM 128 on server 118; a VM 144, a VM 146, and a virtual switch 148 on server 136 over network 116. Multi-destination forwarding tables 152, also referred to as "mdest forwarding tables 152", are generated by network controller 102 and stored in persistent storage 142 when a multi-destination node joins or leaves a multi-destination group.

Figure 2:
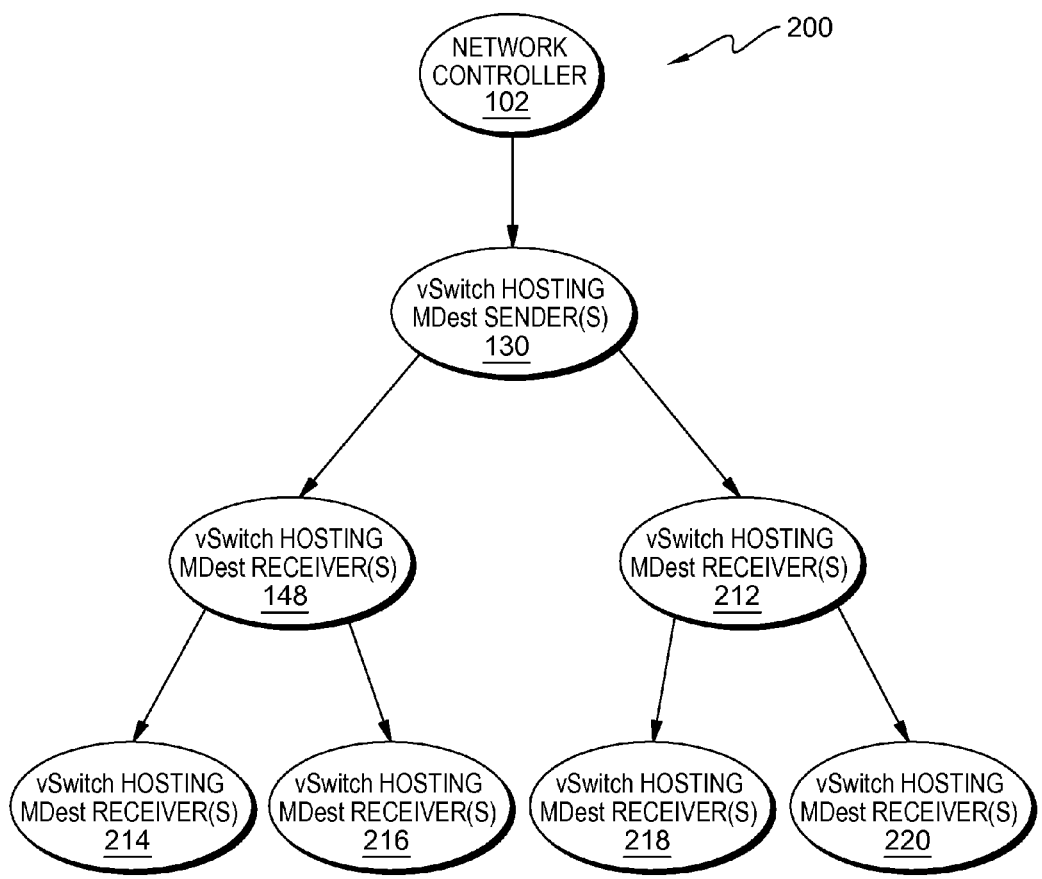
FIG. 2 is a functional diagram illustrating a computed propagation tree for a unique multi-destination group including a multi-destination sender and multiple multi-destination receivers, within the multi-destination packet processing environment of FIG. 1, in an embodiment in accordance with the present invention.

FIG. 2 is a functional diagram, generally designated 200, illustrating a computed propagation tree for a unique multi-destination group including a multi-destination sender and multiple multi-destination receivers, within the multi-destination packet processing environment of FIG. 1, in an embodiment in accordance with the present invention. Multi-destination packet processing environment 100 (see FIG. 1), from a virtual switch perspective, includes network controller 102, vSwitch 130, vSwitch 148, vSwitch 212, vSwitch 214, vSwitch 216, vSwitch 218, and vSwitch 220. In the example embodiment, network controller 102: (i) receives a registration request from vSwitch 220 hosting one or more multi-destination receivers; (ii) computes an optimal paths set for the registered multi-destination groups of each vSwitch hosting multi-destination receivers; and (iii) creates a multi-destination forwarding tree based on the optimal paths set. The computed forwarding tree includes vSwitch 130 acting as the multi-destination sender to multi-destination receiver vSwitches 148, 212, 214, 216, 218, and 220. In the event that a multi-destination sender deactivates or is unable to communicate, the multi-destination forwarding tree programmed for that particular flow becomes irrelevant and network controller 102 sends a flush message to each virtual switch involved to flush the forwarding tree for that multi-destination group.

In the example embodiment, VM 144 and VM 146 on server 136 are multi-destination receiver hosts that register with vSwitch 148 to join a multi-destination group. In other example embodiments, vSwitches may probe the VM host to determine whether the VM host is still interested in the list of multi-destination group(s) that the VM host originally showed interest in joining. Depending upon the response from the VM host, the virtual switch will refresh the entry or will send a leave request for a multi-destination group for that particular VM host. VM 144 communicates with VM 126 through virtual switch 148 and virtual switch 130 using an overlay virtual network on network 116. VM 146 communicates with VM 128 through virtual switch 148 and virtual switch 130 using a separate overlay virtual network on network 116. VNTEP nodes (e.g., virtual switch 130) hosting multi-destination receivers (e.g., VM 144 and VM 146), join multi-destination groups managed by network controller 102. There can be many more vSwitches hosting multi-destination senders and receivers in multi-destination packet processing environment 100 than those depicted in FIG. 2.

Network controller 102 programs multi-destination forwarding tables (including the virtual network (VN), the multi-destination group, and a multi-destination reachable member vSwitch list) on each of the VNTEP nodes in the tree. In this example embodiment, vSwitch 130 receives the computed multi-destination forwarding table from network controller 102 and stores the multi-destination forwarding table in persistent storage 124 as multi-destination forwarding tables 134. The multi-destination forwarding tables include data relating to the virtual networks and multi-destination groups that VM 126, VM 128, and vSwitch 130 are members of, and the multi-destination reachable members for vSwitch 130. In another example embodiment, vSwitch 130 may poll network controller 102 or other devices periodically to determine if there is a new multi-destination forwarding table for the joined multi-destination groups that vSwitch 130 has registered for.

In the example embodiment, vSwitch 130 only has two reachable members (e.g., vSwitch 148 and vSwitch 212) for the registered multi-destination group(s) in which VM 126 and VM 128 may be registered for, as seen in FIG. 2. The number of reachable members vary for each virtual switch in the multi-destination forwarding tree. In the example embodiment, vSwitch 148 has vSwitch 214 and vSwitch 216 in the reachable members list, as seen in FIG. 2. The reachable members of vSwitch 212 are vSwitch 218 and vSwitch 220, as also seen in FIG. 2. A reachable member is a node that is directly connected to a vSwitch and is only one hop away. In computer networking, a hop is one portion of a path between a source device and a destination device, where each time packets are passed to the next device, a hop occurs.

The multi-destination forwarding tree is recomputed at network controller 102 and reprogrammed on each of the vSwitch nodes every time a new multi-destination receiver joins or leaves the multi-destination group. In the example embodiment, vSwitch 220 registers one or more multi-destination receiver hosts that register with vSwitch 220 to join one or more multi-destination groups. Network controller 102 recomputes the optimal paths set for the vSwitches hosting multi-destination receivers and creates a multi-destination forwarding tree that is replicated on each of the VNTEP nodes in the tree. Each replicated copy of the multi-destination forwarding tree is unique to its corresponding multi-destination sender vSwitch. That is, when a particular vSwitch is sending a multi-destination packet, the vSwitch is acting as the multi-destination sender in the multi-destination forwarding tree, and the remaining vSwitches are the multi-destination receivers, as described in the example embodiment and depicted in FIG. 2.

In an example embodiment, VM 126 transmits a multi-destination packet to one or more multi-destination groups registered by vSwitch 130. Virtual switch 130 receives the multi-destination packet from VM 126, and multi-destination software 132 replicates the packet for the number of multi-destination VNTEPs (e.g., vSwitch 148 and vSwitch 212) listed in multi-destination forwarding tables 134. The replicated multi-destination packets are transmitted to vSwitch 148 and vSwitch 212 where they replicate and transmit the received multi-destination packet to the multi-destination VNTEPs (e.g., vSwitch 214 and vSwitch 216 for vSwitch 148, and vSwitch 218 and vSwitch 220 for vSwitch 212) listed in multi-destination forwarding tables 134 and 152.

Figure 3:
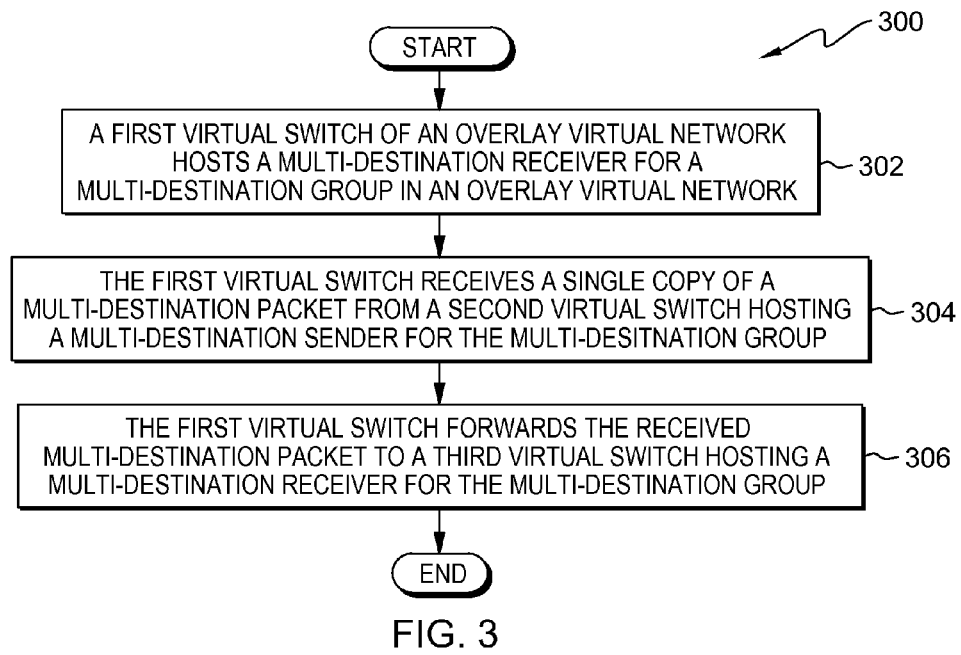
FIG. 3 is a flowchart depicting operational steps of centralizing control and distributed processing of multi-destination forwarding activities within the multi-destination packet processing environment of FIG. 1, in an embodiment in accordance with the present invention.

FIG. 3 is a flowchart, generally designated 300, depicting the operational steps of centralizing control and distributed processing of multi-destination forwarding activities within the multi-destination packet processing environment of FIG. 1, in an embodiment in accordance with the present invention. In an example embodiment, vSwitch 148 is a virtual switch, in an overlay virtual network of network 116, that hosts one or more multi-destination receivers for one or more multi-destination groups as depicted in step 302. Some examples of multi-destination receivers of vSwitch 148 would be VM 144 and VM 146. In another example embodiment, vSwitch 148 may host one or more multi-destination computing nodes on one or more computing devices within the multi-destination packet processing environment 100.

In step 304, vSwitch 148 receives a single copy of a multi-destination packet from vSwitch 130 that is hosting one or more multi-destination senders for the one or more multi-destination groups. In this example embodiment, vSwitch 130 is the root node and vSwitch 148 is a child node in a multi-destination forwarding tree generated by network controller 102. The multi-destination forwarding tree and optimal path graph is unique to each vSwitch in the multi-destination forwarding tree. Network controller 102 is responsible for creating optimal path graphs of network nodes representing VNTEPs connecting virtual switches (vSwitch) to the OVN transport network and for reducing copies of multi-destination packets on each of the participating nodes. Network controller 102 creates an optimal path graph using an algorithm for finding the shortest path between nodes and stores the created optimal path graphs in persistent storage on each vSwitch of the multi-destination forwarding tree (e.g., mdest forwarding tables 112 in persistent storage 108, mdest forwarding tables 134 in persistent storage 124, and mdest forwarding tables 152 in persistent storage 142).

Virtual switch 148 forwards the received copy of the multi-destination packet to one or more virtual switches that are hosting one or more multi-destination receivers for the one or more multi-destination groups as depicted in step 306. In this example embodiment, vSwitch 214 and vSwitch 216 are child nodes in the multi-destination forwarding tree generated by network controller 102. Virtual switch 148 replicates the received multi-destination packet from vSwitch 130 and encapsulates the replicated multi-destination packet for the destination virtual switch with tunneling protocol specific headers. In computer networking, encapsulation is a method of designing modular communication protocols in which logically separate functions in the network are abstracted from their underlying structures by inclusion or information hiding within higher level objects. A tunneling protocol allows a network user to access or provide a network service that the underlying network does not support or provide directly. One use of a tunneling protocol is to allow a foreign protocol to run over a network that does not support that particular protocol, e.g., running IPv6 over IPv4. The replicated packets are transmitted to vSwitch 214 and vSwitch 216 as well as to any registered multi-destination receivers of vSwitch 148 (e.g., VM 126 and VM 128) for processing.

Figure 4:
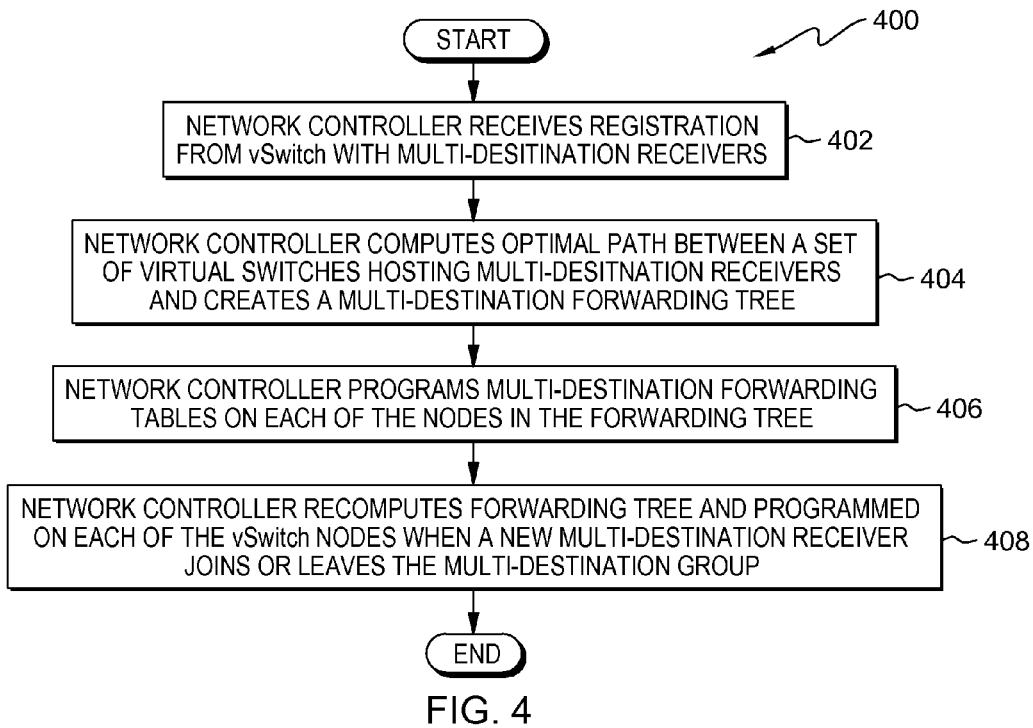
FIG. 4 is a flowchart depicting operational steps of a network controller registering multi-destination receivers, computing a multi-destination forwarding tree, and programming the computed tree on the all nodes of the tree within the multi-destination packet processing environment of FIG. 1, in an embodiment in accordance with the present invention.

FIG. 4 is a flowchart, generally designated 400, depicting operational steps of a network controller registering multi-destination receivers, computing a multi-destination forwarding tree, and programming the computed tree on the all nodes of the tree within the multi-destination packet processing environment of FIG. 1, in an embodiment in accordance with the present invention. Network controller 102 receives a registration notification from a VNTEP vSwitch 220 with one or more multi-destination receivers joining one or more multi-destination groups as depicted in step 402. In one example embodiment, the multi-destination registration request received by network controller 102 may be a multicast group join request.

In step 404, network controller 102 computes optimal paths set of the vSwitches hosting multi-destination receivers and creates a multi-destination forwarding tree. The computed multi-destination forwarding tree identifies the virtual network, the joined multi-destination group for each vSwitch and its multi-destination receiver nodes, and the multi-destination reachable member vSwitch list. In one example embodiment, the multi-destination forwarding tree may contain a default router list. In other example embodiments, the multi-destination forwarding tree may contain a list of on-link prefixes (i.e., addresses that can be resolved locally and do not need a gateway or to be routed) of default routers using the internet protocol version 6 (IPv6) neighbor discovery protocol. In general, the computed multi-destination forwarding tree may contain any data or information for any protocol or application to determine the optimal data paths.

Network controller 102 programs multi-destination forwarding tables (consisting of the virtual network, the joined multi-destination groups, and the multi-destination reachable member vSwitch list) on each of the nodes in the tree as depicted in step 406. Network controller 102 transmits the multi-destination forwarding tables to vSwitch 130 over network 116. In the example embodiment, vSwitch 130 stores multi-destination forwarding tables 134 in persistent storage 124. In another example embodiment, multi-destination forwarding tables 134 may be stored in the RAM of a hypervisor in which vSwitch 130 executes. Network controller 102 continues the process by programing vSwitch 148 with the new multi-destination forwarding tables 152 including the virtual network, the joined multi-destination group for each vSwitch 148 and its multi-destination receiver nodes, and the multi-destination reachable member vSwitch list. Network controller 102 continues programming the new multi-destination forwarding tables on the rest of the vSwitches of the multi-destination forwarding tree for vSwitch 212, 214, 216, 218, and 220.

In step 408, network controller 102 recomputes and reprograms the multi-destination forwarding tree on each of the vSwitch nodes in response to a new multi-destination receiver joining or leaving the multi-destination group. In the example embodiment, vSwitch 220 processes requests from one or more multi-destination receiver hosts that register with vSwitch 220 to join one or more multi-destination groups. Network controller 102 receives a multi-destination join request from vSwitch 220 and recomputes the multi-destination forwarding tree which identifies the virtual network, the joined multi-destination group for each vSwitch and its multi-destination receiver nodes, and the multi-destination reachable member vSwitch list. In one example embodiment, the multi-destination forwarding tree may contain internet control message protocol version 6 (ICMPv6) messages. ICMPv6 is the IPv6 implementation of internet control message protocol (ICMP) which is used by network devices, such as routers, to send error messages indicating, for example, that a requested service is not available or that a host or router could not be reached. ICMP and ICMPv6 can also be used to relay query messages. In other example embodiments, vSwitches may send multi-destination queries to build the multi-destination forwarding tree.

Figure 5:
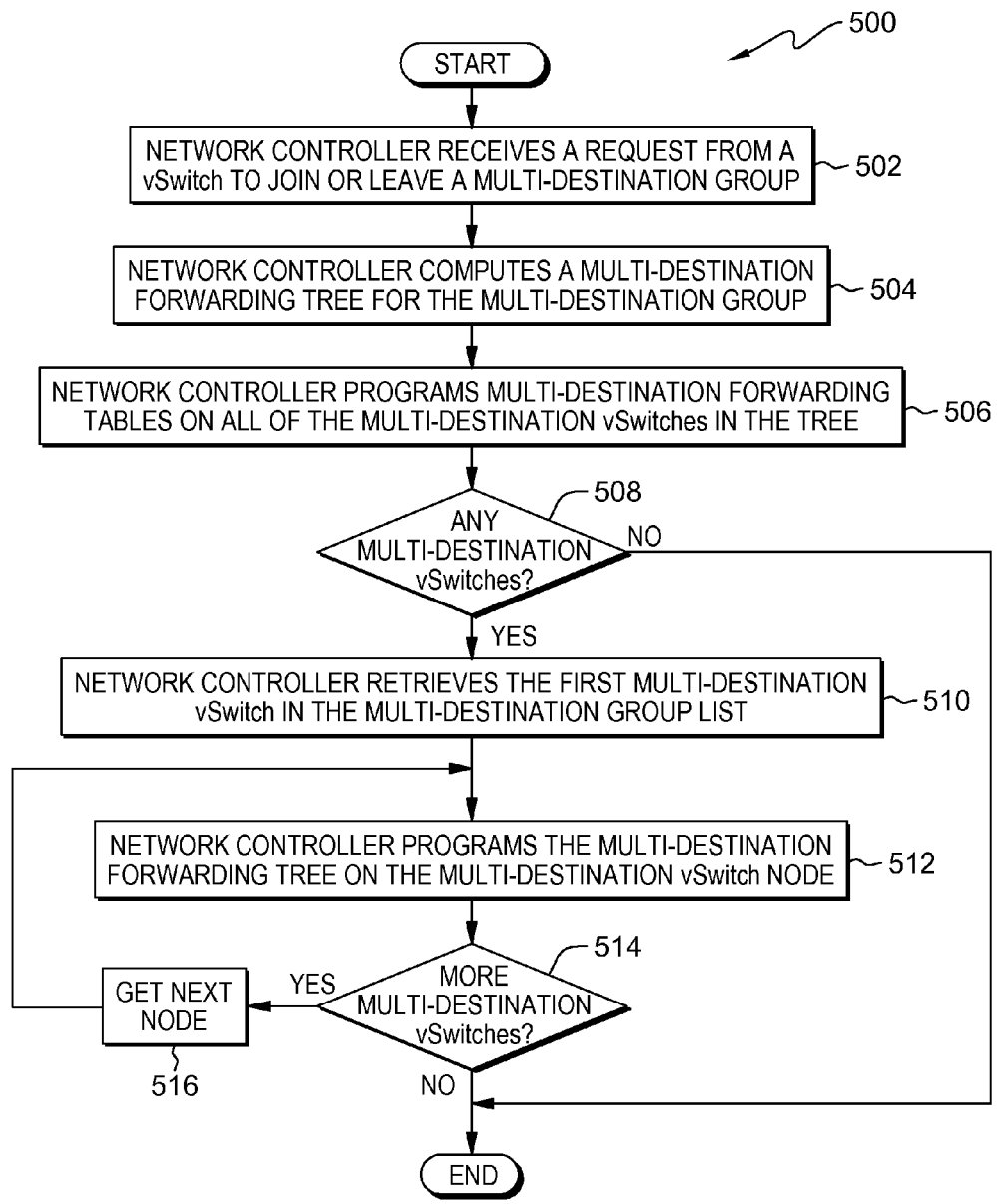
FIG. 5 is a flowchart depicting the operational steps of a network controller re-computing the multi-destination forwarding tree and programming the computed tree on all of the nodes of the tree within the multi-destination packet processing environment of FIG. 1, in an embodiment in accordance with the present invention.

FIG. 5 is a flowchart, generally designated 500, depicting the operational steps of a network controller re-computing the multi-destination forwarding tree and programming the computed tree on the all nodes of the tree within the multi-destination packet processing environment of FIG. 1, in an embodiment in accordance with the present invention. Network controller 102 receives a request from a vSwitch, also referred to as a VNTEP node, to join a multi-destination group on one or more virtual overlay networks as depicted in step 502. In other example embodiments, the multi-destination request received by network controller 102 may be a multicast group join request on an internet protocol (IP) routing level, where routers create optimal distribution paths for datagrams sent to a multicast destination address. IP multicast is a technique for one-to-many communication over an IP infrastructure in a network.

In one example, network controller 102 receives a multi-destination group join request in response to a VM booting or initializing. At some point during the VM boot process, the VM provides, or transmits, an intent to join a particular multi-destination group or groups. In another example, network controller 102 receives a multi-destination group join request during run time in response to a VM transmitting a request to join or leave one or more particular multi-destination groups.

In step 504, network controller 102 computes multi-destination forwarding tables 112 for the current multi-destination group. The computed multi-destination forwarding table (also referred to as a forwarding "tree") identifies one or more virtual networks, the joined multi-destination group for each vSwitch VNTEP and its multi-destination receiver nodes, and the multi-destination reachable member vSwitch list. In other example embodiments, network controller may also compute or collect statistics, such as round trip times and network throughputs for each of the vSwitch VNTEPs in multi-destination forwarding tables 112.

Network controller 102 programs one or more multi-destination forwarding tables on all of the vSwitch VNTEP nodes in the multi-destination forwarding tables 112 as depicted in step 506. Network controller 102 transmits the computed multi-destination forwarding tables 112 to each vSwitch in the computed tree. The vSwitch receives the new multi-destination forwarding table and updates the local copy. In one example embodiment, network controller 102 may inform the vSwitch VNTEPs of the updated multi-destination forwarding table, and in response, each vSwitch may individually download a copy of the multi-destination forwarding tables 112.

In decision step 508, network controller 102 checks to see if there are any vSwitch VNTEPs in the computed multi-destination forwarding tables 112 to program. If there are vSwitch VNTEPs in the computed multi-destination forwarding tables 112 ("Yes" branch, decision step 508), network controller 102 retrieves the first multi-destination vSwitch VNTEP node in the multi-destination group list as depicted in step 510. If there are no vSwitch VNTEPs in the computed multi-destination forwarding tables 112 ("No" branch, decision step 508), network controller 102 ends processing and completes.

Network controller 102 programs the multi-destination forwarding tables 112 on the vSwitch VNTEP node as depicted in step 512. In the example embodiment, vSwitch 130 is the first VNTEP in the multi-destination forwarding tree (i.e, multi-destination forwarding tables 112). Virtual switch 130 stores the multi-destination forwarding list in persistent storage 124 as "multi-destination forwarding tables 134". Persistent storage 124 may, for example, be a hypervisor where the virtual switch runs, and multi-destination forwarding tables 134 may be stored in the form of constant complexity data structures to provide deterministic read/write/search latencies. Constant complexity data structures are data stores that provide deterministic latency for read/write/search operations in computer processing programming. An example of a constant complexity data structure is a red black tree, also referred to as a binary tree, which is a self-balancing tree where the add, delete, and search operations are performed in O(log n) time, where n is the total number of elements in the tree.

In decision step 514, network controller 102 checks to see if there are more vSwitch VNTEPs in the computed multi-destination forwarding tables 112. If there are still more vSwitches to program ("Yes" branch, decision 514), network controller 102 gets the next VNTEP node from the multi-destination forwarding list as depicted in step 516. If there are no more vSwitches to program ("No" branch, decision 514), network controller 102 completes the process and waits for another update (e.g., a vSwitch node to join or leave a multi-destination group) to multi-destination forwarding tables 112. In other example embodiments, network controller 102 may poll the vSwitch VNTEPs in the multi-destination forwarding tree to make sure a node did not unexpectedly terminate and not transmit a multi-destination remove request.

Figure 6:
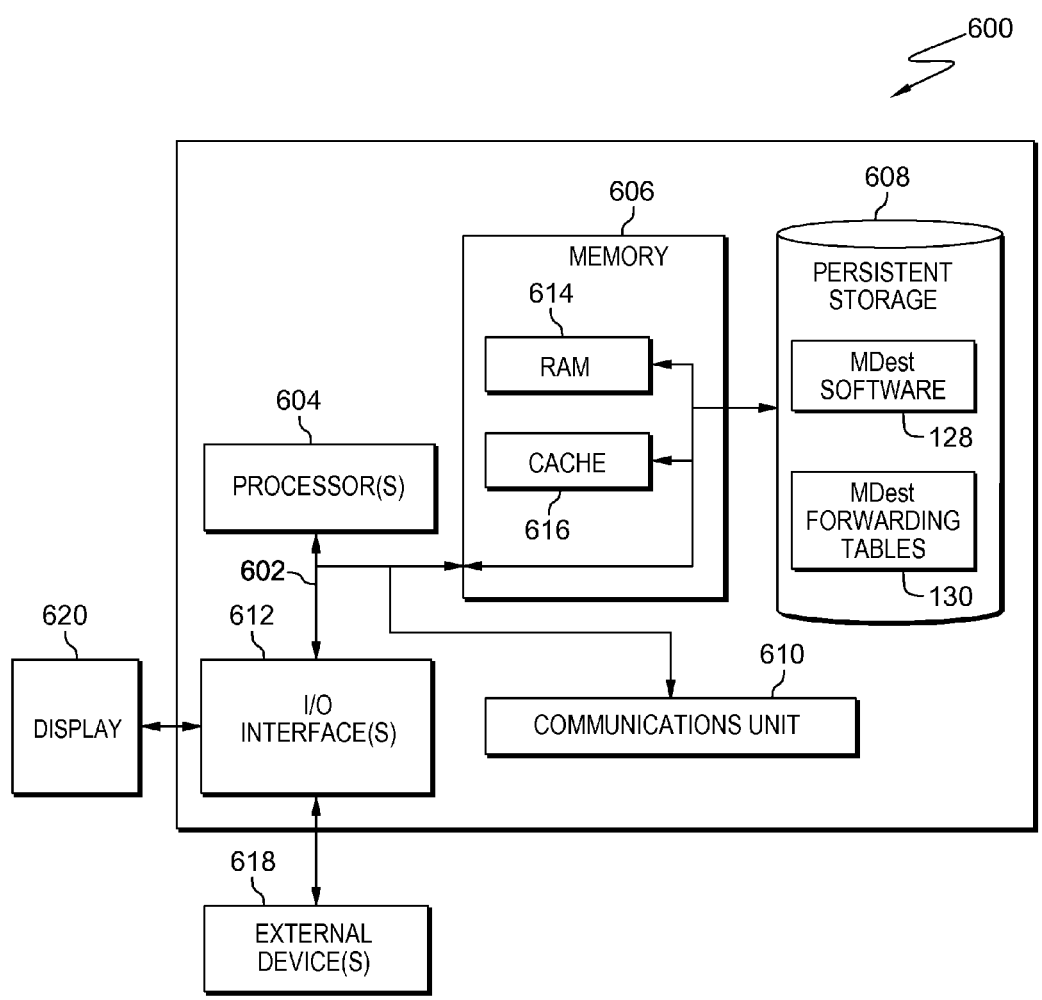
FIG. 6 depicts a block diagram of components of an electronic device, in an embodiment in accordance with the present invention.

FIG. 6 depicts a block diagram of components of an electronic device 600, in an embodiment in accordance with the present invention. Electronic device 600 is an example of each of network controller, server 118, and server 136 of FIG. 1. It should be appreciated that FIG. 6 provides only an illustration of one implementation and does not imply any limitations with regard to the environments in which different embodiments may be implemented. Many modifications to the depicted environment may be made.

Device 600 includes communications fabric 602, which provides communications between computer processor(s) 604, memory 606, persistent storage 608, communications unit 610, and input/output (I/O) interface(s) 612. Communications fabric 602 can be implemented with any architecture designed for passing data and/or control information between processors (such as microprocessors, communications and network processors, etc.), system memory, peripheral devices, and any other hardware components within a system. For example, communications fabric 602 can be implemented with one or more buses.

Memory 606 and persistent storage 608 are computer readable storage media. In this embodiment, memory 606 includes random access memory (RAM) 614 and cache memory 616. In general, memory 606 can include any suitable volatile or non-volatile computer readable storage media.

Multi-destination software 622 and multi-destination forwarding tables 624 are stored in persistent storage 608 for execution by one or more of the respective computer processors 604 via one or more memories of memory 606. Multi-destination software 622 is an example of each of multi-destination software 110, 132, and 150 of FIG. 1, and multi-destination forwarding tables 624 is an example of each of multi-destination forwarding tables 112, 134, and 152 of FIG. 1. In this embodiment, persistent storage 608 includes a magnetic hard disk drive. Alternatively, or in addition to a magnetic hard disk drive, persistent storage 608 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 608 may also be removable. For example, a removable hard drive may be used for persistent storage 608. Other examples include optical and magnetic disks, thumb drives, and smart cards that are inserted into a drive for transfer onto another computer readable storage medium that is also part of persistent storage 608.

Communications unit 610, in these examples, provides for communications with other data processing systems or devices, including resources of network 116. In these examples, communications unit 610 includes one or more network interface cards. Communications unit 610 may provide communications through the use of either or both physical and wireless communications links. Multi-destination software 622 and multi-destination forwarding tables 624 may be downloaded to persistent storage 608 through communications unit 610.

I/O interface(s) 612 allows for input and output of data with other devices that may be connected to device 600. For example, I/O interface 612 may provide a connection to external devices 618 such as a keyboard, keypad, a touch screen, and/or some other suitable input device. External devices 618 can also include portable computer readable storage media such as, for example, thumb drives, portable optical or magnetic disks, and memory cards. Software and data used to practice embodiments of the present invention, e.g., multi-destination software 622 and multi-destination forwarding tables 624, can be stored on such portable computer readable storage media and can be loaded onto persistent storage 608 via I/O interface(s) 612. I/O interface(s) 612 also connect to a display 620.

Display 620 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method comprising:
hosting, by a first virtual switch of an overlay virtual network, a multi-destination receiver for a multi-destination group;
receiving, by the first virtual switch, from a second virtual switch hosting a multi-destination sender for the multi-destination group, a single copy of a multi-destination packet, wherein the first virtual switch is represented by a node of a plurality of nodes in a tree created by a network controller, wherein the tree is unique to the first virtual switch, and wherein each of the nodes represents a virtual switch that has registered a multi-destination receiver with the network controller; and
forwarding, by the first virtual switch, the received multi-destination packet to a third virtual switch hosting a multi-destination receiver for the multi-destination group, wherein the third virtual switch is represented in the tree by a child of the node.

2. The method of claim 1, wherein the node is a root node of the tree.

3. The method of claim 1, further comprising:
prior to forwarding the received multi-destination packet to the third virtual switch, receiving, by the first virtual switch, a forwarding table specific to the multi-destination group from the network controller, wherein the forwarding table includes data entered by the network controller based on optimal paths between virtual switches that each host a multi-destination receiver for the multi-destination group.

4. The method of claim 3, wherein the received multi-destination packet is forwarded to the third virtual switch by the first virtual switch according to the received forwarding table.

5. The method of claim 1, wherein the first virtual switch is the only virtual switch represented by a node in the tree that receives a copy of the packet from the second virtual switch.

6. The method of claim 1, wherein forwarding the received multi-destination packet further comprises replicating, by the first virtual switch, the received multi-destination packet for a number of reachable members, wherein each reachable member is a virtual switch represented in the tree by a child of the node, and wherein the third virtual switch is one of the reachable members.

7. A computer program product comprising:
one or more computer readable storage media and program instructions stored on the one or more computer readable storage media, wherein the computer readable storage medium is not a transitory signal per se, the stored program instructions comprising:
program instructions to host, by a first virtual switch of an overlay virtual network, a multi-destination receiver for a multi-destination group;
program instructions to receive, by the first virtual switch, from a second virtual switch hosting a multi-destination sender for the multi-destination group, a single copy of a multi-destination packet, wherein the first virtual switch is represented by a node of a plurality of nodes in a tree created by a network controller, wherein the tree is unique to the first virtual switch, and wherein each of the nodes represents a virtual switch that has registered a multi-destination receiver with the network controller; and
program instructions to forward, by the first virtual switch, the received multi-destination packet to a third virtual switch hosting a multi-destination receiver for the multi-destination group, wherein the third virtual switch is represented in the tree by a child of the node.

8. The computer program product of claim 7, wherein the node is a root node of the tree.

9. The computer program product of claim 7, the stored program instructions further comprising:
program instructions to, prior to forwarding the received multi-destination packet to the third virtual switch, receiving, by the first virtual switch, a forwarding table specific to the multi-destination group from the network controller, wherein the forwarding table includes data entered by the network controller based on optimal paths between virtual switches that each host a multi-destination receiver for the multi-destination group.

10. The computer program product of claim 9, wherein the program instructions to forward the received multi-destination packet to the third virtual switch comprise program instructions to forward the received multi-destination packet according to the received forwarding table.

11. The computer program product of claim 7, wherein the first virtual switch is the only virtual switch represented by a node in the tree that receives a copy of the packet from the second virtual switch.

12. The computer program product of claim 7, wherein the program instructions to forward the received multi-destination packet further comprise program instructions to replicate, by the first virtual switch, the received multi-destination packet for a number of reachable members, wherein each reachable member is a virtual switch represented in the tree by a child of the node, and wherein the third virtual switch is one of the reachable members.

13. A computer system comprising:
one or more computer processors;
one or more computer readable storage media;
program instructions stored on the computer readable storage media for execution by at least one of the one or more processors, the stored program instructions comprising:
program instructions to host, by a first virtual switch of an overlay virtual network, a multi-destination receiver for a multi-destination group;
program instructions to receive, by the first virtual switch, from a second virtual switch hosting a multi-destination sender for the multi-destination group, a single copy of a multi-destination packet, wherein the first virtual switch is represented by a node of a plurality of nodes in a tree created by a network controller, wherein the tree is unique to the first virtual switch, and wherein each of the nodes represents a virtual switch that has registered a multi-destination receiver with the network controller; and
program instructions to forward, by the first virtual switch, the received multi-destination packet to a third virtual switch hosting a multi-destination receiver for the multi-destination group, wherein the third virtual switch is represented in the tree by a child of the node.

14. The computer system of claim 13, wherein the node is a root node of the tree.

15. The computer system of claim 13, the stored program instructions further comprising:
program instructions to, prior to forwarding the received multi-destination packet to the third virtual switch, receiving, by the first virtual switch, a forwarding table specific to the multi-destination group from the network controller, wherein the forwarding table includes data entered by the network controller based on optimal paths between virtual switches that each host a multi-destination receiver for the multi-destination group.

16. The computer system of claim 13, wherein the first virtual switch is the only virtual switch represented by a node in the tree that receives a copy of the packet from the second virtual switch.

17. The computer system of claim 13, wherein the program instructions to forward the received multi-destination packet further comprise program instructions to replicate, by the first virtual switch, the received multi-destination packet for a number of reachable members, wherein each reachable member is a virtual switch represented in the tree by a child of the node, and wherein the third virtual switch is one of the reachable members.

18. The method of claim 1, wherein for each virtual switch represented by a node of the plurality of nodes in the overlay virtual network:
the network controller computes an optimal path graph of network nodes representing virtual network tunneling endpoints (VNTEPs) connecting virtual switches to the overlay virtual network;
the network controller creates a unique multi-destination forwarding tree based on the optimal path graph; and
the network controller stores the unique multi-destination forwarding tree in persistent storage accessed by the node of the plurality of nodes in the overlay virtual network.

19. The method of claim 1, wherein the tree created by the network controller contains a list of on-link prefixes of default routers obtained using an internet protocol version 6 (IPv6) neighbor discovery protocol, wherein the on-link prefixes are addresses that are locally resolvable.

20. The method of claim 19, wherein the tree created by a network controller is stored in a hypervisor that a virtual switch represented by a node of the plurality of nodes is executing on, wherein the tree is stored in the form of a constant complexity data structure.

\* \* \* \* \*